(12) United States Patent
Hains

(10) Patent No.: US 7,215,444 B2
(45) Date of Patent: May 8, 2007

(54) SYSTEMS AND METHODS FOR DESIGNING ZERO-SHIFT SUPERCELL HALFTONE SCREENS

(75) Inventor: Charles M. Hains, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 1049 days.

(21) Appl. No.: 10/195,424

(22) Filed: Jul. 16, 2002

(65) Prior Publication Data

US 2004/0011233 A1 Jan. 22, 2004

(51) Int. Cl.
*H04N 1/405* (2006.01)
*G03F 5/00* (2006.01)

(52) U.S. Cl. ............... 358/3.09; 358/534; 358/536; 359/893; 399/180; 399/181

(58) Field of Classification Search ............... 358/3.09, 358/3.28, 1.14, 3.2, 1.9, 1.15, 3.1, 3.26, 447, 358/893, 3.03, 3.08, 3.3, 536, 429, 456, 459, 358/298, 534; 347/12, 5, 9, 13; 382/237, 382/100, 252, 296; 399/180, 181; 359/893
See application file for complete search history.

(56) References Cited

U.S. PATENT DOCUMENTS 5,124,803 A * 6/1992 Troxel ............... 358/3.26

OTHER PUBLICATIONS

T. M. Holladay, "An Optimum Algorithm for Halftone Generation for Displays and Hard Copies," *Proceedings of the SID*, vol. 21/2, pp. 185-192, 1980.

* cited by examiner

*Primary Examiner*—Twyler Lamb
*Assistant Examiner*—Steven Kau
(74) *Attorney, Agent, or Firm*—Oliff & Berridge PLC

(57) ABSTRACT

Conventional design tools were not developed for designing square zero-shift supercells. Conventionally, solutions that enable square zero-shift supercells were found by trial and error or by exhaustive analysis. According to a first design criterion of this invention, a non-square supercell in a first frame of reference has a diagonal that is equal in length to the diagonal of a square supercell in a second frame of reference rotated at a desired screen angle to the first frame of reference. The screen angle is a function of the lengths of the sides of the non-square supercell in the first frame of reference. According to a second design criterion, if the area of the corresponding square supercell in the second frame of reference is an integer, a square zero-shift supercell can be designed based on the lengths of the sides of the non-square supercell in the first frame of reference.

7 Claims, 14 Drawing Sheets

SYSTEMS AND METHODS FOR DESIGNING ZERO-SHIFT SUPERCELL HALFTONE SCREENS

BACKGROUND OF THE INVENTION

1. Field of Invention

This invention relates to designing zero-shift supercell halftone screens.

2. Description of Related Art

With the advent of inexpensive digital printers, methods and systems for digital halftoning have become increasingly important. It is well understood that most digital printers operate in a binary mode, i.e., printing or not printing a halftone dot at a specified location or pixel. Digital halftoning controls the printing of halftone dots, where spatially averaging of the printed dots provides the illusion of the continuous tones present in an original image.

The most common halftone technique is threshold screening, which compares the image value of each pixel in the original image with one of several predetermined threshold levels that are stored in a halftone screen. If the image value is "darker" than the applied threshold halftone level, a spot of ink or toner is printed at that pixel. Otherwise, the pixel is left unprinted, so that the background color of the image receiving medium is visible. It is well understood in the art that the distribution of printed pixels depends on the design of the halftone screen.

Halftone screens are typically two-dimensional threshold arrays and are relatively small in comparison to the overall image or document to be printed. Therefore, the screening process uses an identical halftone screen cell repeated for each color separation in a manner similar to tiling. The output of the screening process, using a single-cell halftone dot, includes a binary pattern of multiple small "dots", which are regularly spaced and are determined by the size and the shape of the halftone screen. In other words, the screening output, as a two-dimensionally repeated pattern, possesses two fundamental spatial frequencies, which are completely defined by the geometry of the halftone screen.

It should be appreciated that, in the halftoning arts, square halftone cells, tiled in a zero-shift manner, can be easily combined to form a supercell. In contrast, non-zero-shift tiling results in a brick-like pattern, where the cells of one row are laterally offset relative to the upper and lower adjacent rows. Zero-shift refers to the corners of each of the square halftone supercells meeting at a common point. FIG. 1 illustrates two halftone supercells that have a non-zero shift. Because supercells are formed by combining a number of halftone cells, supercells can be used to form a "macro" halftone screen for halftoning the original image. Because a supercell is, by definition, larger than the individual halftone cells used to form the supercell, the resulting screen can have more threshold levels and can achieve better visual angles, on average, than the simple cell halftone. Reducing the number of centers in supercells that achieve the desired effects increases the efficiency of the supercell in conserving resources such as, for example, memory, processing power, and the like.

Conventionally, halftone screen designers have a number of conventional design tools usable to create a halftone screen utilizing supercells. In general, these conventional tools allow the halftone screen designer to create supercells based on magnifying Holladay dots. Holladay dots are described in "An Optimal Algorithm For Halftone Generation For Display And Hard Copies", T. Holladay, *Proceedings of the Society for Information Display*, Vol. 21, No. 2, pages 185–192, 1980. As shown in FIG. 1, these conventional Holladay dots are described as a threshold array in an implementation rectangle that includes a shift between rows of tiled rectangles.

Current PostScript halftoning implementations have difficulty using arbitrary Holladay dots. These software implementations of the PostScript standard are usually optimized for PostScript type 3 dots. In particular, PostScript type 3 dots are zero-shift-square tiles that abut at the corners, as outlined above. These software implementations of the PostScript standard also work most efficiently when these square tiles contain a multiple of 32 pixels per tile.

SUMMARY OF THE INVENTION

However, conventional supercell schemes attempt to fit a supercell among halftone screens at specified desired angles. This process usually involves a priori knowledge of the printer resolution, the angle of the halftone screen relative to the raster of the printer, and the frequency of the halftone cells. Typically, conventional zero-shift supercell design schemes also require searching all of the possible sizes for the base halftone cell to arrive at the base halftone cell size that facilitates the placement of the centers of the base halftone cells at the corners of the square zero-shift supercells.

Unfortunately, the above-outlined conventional design tools were not designed with the requirements for square zero-shift supercells in mind. Thus, a potential solution for a particular halftone screen provided by these design tools would be located without taking into consideration the requirements for zero-shift-supercells. Thus, conventionally, a solution that enables square zero-shift supercells was found either by trial and error or by exhaustive analysis. Thus, designing halftone screens that use square zero-shift supercells using these tools is inherently an inefficient process.

This invention provides systems and methods for efficiently locating a zero-shift supercell solution for a desired halftone screen.

This invention separately provides systems and methods for finding zero-shift supercell using a rotated frame of reference.

This invention separately provides systems and methods that allow a zero-shift supercell solution for a desired halftone screen to be obtained based on printer resolution and desired screen frequency.

This invention separately provides systems and methods that allow zero-shift supercells to be located based on a desired effective visual area for the base halftone cell.

This invention separately provides systems and methods for locating zero-shift-halftone solutions based on a desired screen angle.

In various exemplary embodiments, the systems and methods of this invention make use of a number of design criteria discovered by the inventor of this application. In particular, according to a first design criterion, a non-square supercell in a first frame of reference has a diagonal that is equal in length to the diagonal of a square supercell in a second frame of reference that is rotated at a desired screen angle to the first frame of reference. In particular, the screen angle between the first and second frames of reference is a function of the lengths of the sides of the non-square supercell in the first frame of reference. In various exemplary embodiments, the first frame of reference is aligned with the dots that comprise the halftone screen. In various exemplary embodiments, the second frame of reference is aligned with the output device raster.

According to a second design criterion, if the area of the corresponding square supercell in the second frame of reference is an integer, a square zero-shift supercell can be designed based on the lengths of the sides of the non-square supercell in the first frame of reference.

In general, conventional Holladay methods would identify the square supercell in the second frame of reference as a potential square zero-shift supercell only if the effective area of the non-square supercell in the first frame of reference were a perfect square.

In various exemplary embodiments, the systems and methods according to this invention can be used to determine one or more sets of side lengths for the non-square rectangle in the first frame of reference based on a desired screen angle between the first and second frames of reference. Then, based on the determined side lengths, a resolution of the image forming device on which the square zero-shift halftone screen is to be used and/or the desired screen frequency, an estimated effective visual area of a base halftone cell can be determined. From this estimated effective visual area of the base halftone cell, a side length for the square zero-shift supercell can be determined and an actual effective visual area for the resulting base halftone cell can be determined. An actual screen frequency based on the actual effective visual area can then be determined.

In various other exemplary embodiments, the systems and methods of this invention can be used to design the square zero-shift supercell based on a desired area of the square zero-shift supercell, which must be a perfect square of the integer side length of the square zero-shift supercell. The area of the zero-shift supercell is a function of the side lengths of the non-square supercell in the first frame of reference and the actual visual area of each base halftone cell of the zero-shift supercell. Alternatively, the actual effective visual area of the base halftone cells making up the square zero-shift supercell can be selected such that the supercell area is a perfect square. In either case, the actual screen frequency of the resulting square zero-shift supercell is a function of the resolution of the image forming device on which the square zero-shift supercell halftone screen will be used and the size of the actual effective visual area of the base halftone cells that make up the square zero-shift supercell.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Conventional square zero-shift supercell halftoning schemes require at least a search for all possible sizes of the zero-shift supercell to locate a square zero-shift supercell that is aligned with the centers of an integer number of halftone dots on each edge of the square zero-shift supercell. It should be appreciated that such a search results in a set of candidate square zero-shift supercells. A compromise is effected between the angle of the candidate square zero-shift supercell, the frequency spacing of the square zero-shift supercell, and the resolution of the printer on which the resulting halftone screen will be used. These factors result in conventional square zero-shift supercells having non-ideal angles and/or non-ideal square zero-shift supercell frequencies.

This invention provides systems and methods for designing a halftone screen having a square zero-shift supercell. In particular, in various exemplary embodiments, the systems and methods of this invention use a rotated second frame of reference, angled relative to a first frame of reference, provided in units normalized to dot center distances. Accordingly, because the first and second frames of reference are based on a unit cell, rather than in raster units, the exemplary supercell design systems and methods do not require a priori knowledge of the printer resolution.

Figure 1:
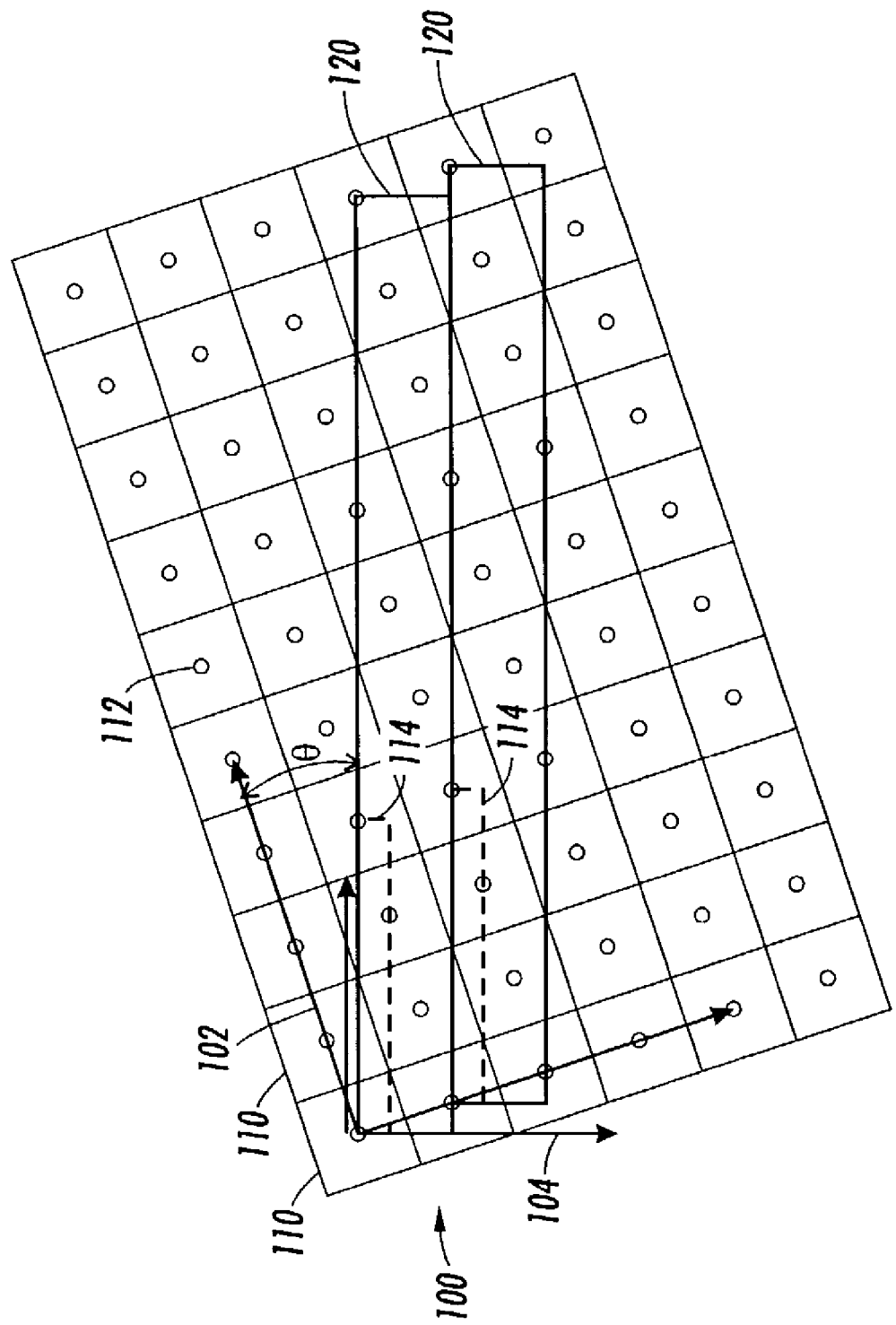
FIG. 1 illustrates a pair of 9-center Holladay cells having a non-zero shift.

As briefly outlined above, one conventional method for designing zero-shift supercells comprises magnifying a base Holladay block. FIG. 1 shows a base halftone screen 100 comprising a plurality of square base halftone cells 110 having centers 112. As shown in FIG. 1, a simple 3,1 Holladay dot 114 can be magnified to form a magnified Holladay block 120. In particular, as shown in FIG. 1, the magnified Holladay block 120 is a 9-center dot. That is, each base halftone cell 110 is considered as a unit cell.

It can be shown geometrically that the area of the simple Holladay block 114 is equal to the combined area of one base halftone cell 110, and that the area of the magnified Holladay block 120 is equal to the area of nine base halftone cells 110. This can also be seen intuitively because the corners of the magnified Holladay blocks 120 are centered, at least partially, on the centers 112 of the base halftone cells 110. The sides of the magnified Holladay blocks 120 pass through additional centers 112 of other base halftone blocks 110.

Based on these criteria, the effective area of the magnified Holladay blocks 120 corresponds to the number of centers 112 fully contained within the magnified Holladay block 120, plus one half the number of centers 112 lying on the edges of the magnified Holladay block 120, plus one quarter of the number of centers 112 lying on the corners of the magnified Holladay block 120. Thus, as shown in FIG. 1, each of the magnified Holladay blocks 120 fully includes 6 of the centers 112, while 5 of the centers 112 lie on the edges of the magnified Holladay blocks 120 and 2 centers lie on corners of the magnified Holladay blocks 120. Thus, $6+5/2+2/4=6+2.5+0.5=9$.

However, making a zero-shift supercell from a PostScript implementation of a magnified multi-center Holladay block would, in general, require many redundant copies of the magnified Holladay blocks. In the worst case, to insure that all four corners of the square zero-shift supercell land on dot centers making such a square zero-shift supercell, would require a square array having the same width as the Holladay block 120. This worst case requires the area of the zero-shift supercell be equal to $n^2$, rather than n, times the area of the base halftone cells. Consequently, the zero-shift supercell has $n^2$, rather than n, times the number of threshold values of the base halftone cell. For the particular example of the expanded Holladay block 120 shown in FIG. 1, it can be shown that a zero-shift square supercell of the same width with only ten times the height would align correctly on the four corners. The exemplary embodiment of the expanded Holladay block 120 shown in FIG. 1 is, however, a special case because n=9 in this example, and 9 is a square number.

Figure 2:
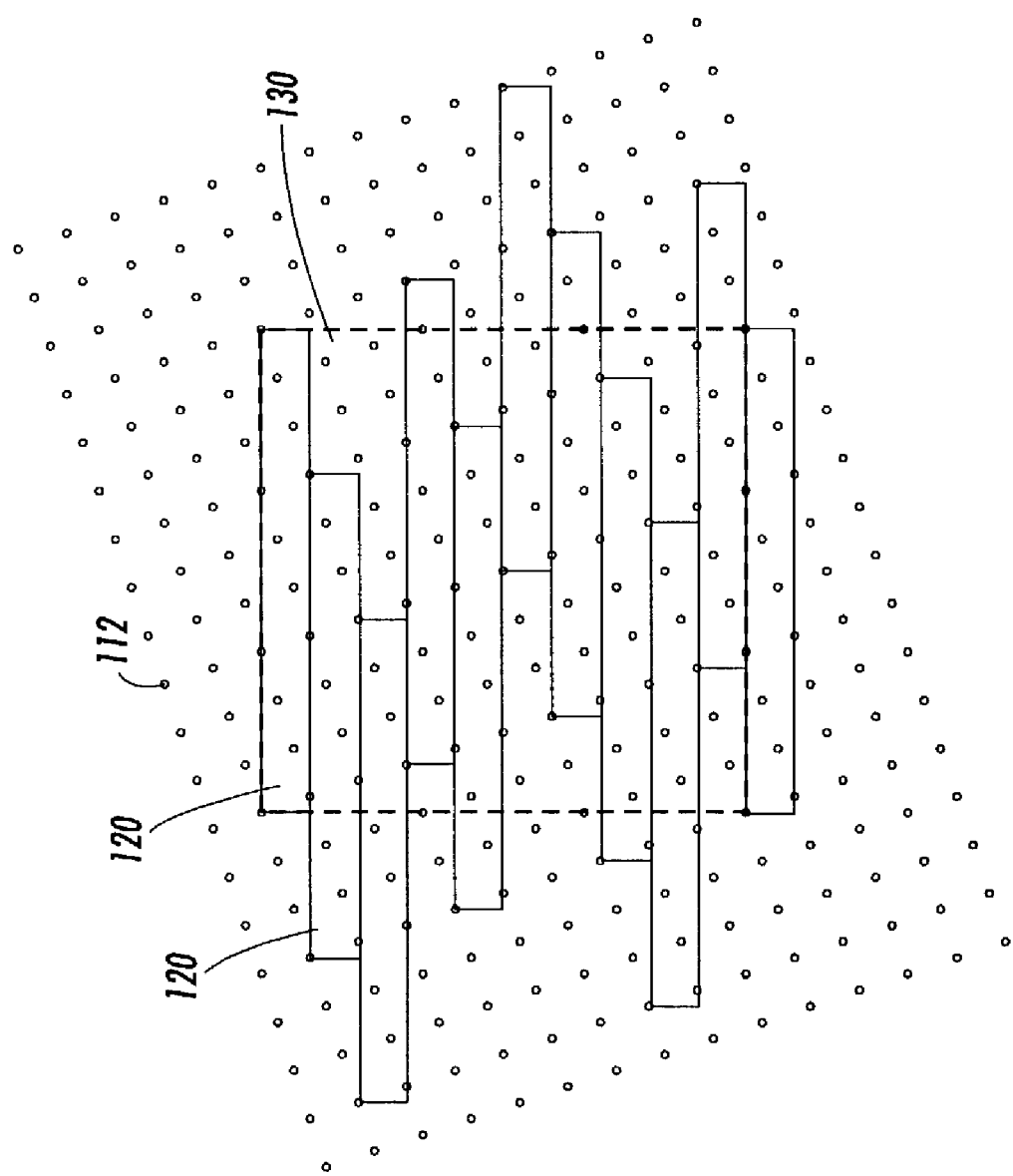
FIG. 2 illustrates how redundant copies of the Holladay block are used in creating a square zero-shift supercell according to this invention.

FIG. 2 illustrates the non-special case, where n is not a square number, such that redundant copies of the expanded Holladay block 120 are needed. As shown in FIG. 2, for most of the Holladay blocks 120, at least some portion of those Holladay blocks 120 extend outside of the square zero-shift supercell 130. In particular, in the exemplary embodiment shown in FIG. 2, only the top-most Holladay block 120 lies entirely within the square zero-shift supercell 130. For each other set of laterally-adjacent pairs of Holladay blocks 120, the portion of one of the pair of Holladay blocks 120 that extends beyond the edge of the square zero-shift supercell 130 is equal in area to the portion of the other Holladay block 120 that lies within the bounds of the square zero-shift supercell 130. That is, when viewed another way, for each row of Holladay blocks 120, the portion of a Holladay block 120 that extends beyond the edges of the square zero-shift supercell 130 is equal to the portion of the zero-shift square supercell 130 associated with that row that is not also within that Holladay block 120.

As briefly outlined above, conventional Holladay methods are significantly inefficient when attempting to design halftone screens having zero-shift supercells. That is, the zero-shift characteristic is present in only a small number of the supercells that can be generated using conventional Holladay methods. However, conventional Holladay methods do not have any techniques for selecting or readily identifying those supercells that have the zero-shift characteristic.

In various exemplary embodiments of the systems and methods according to this invention, based on a desired screen angle for a halftone screen formed using square zero-shift supercells, a second frame of reference, which is rotated by the desired screen angle relative to a first frame of reference, is created. In particular, the rotated second frame of reference is normalized to the distance between the dot centers, such as the dot centers 112 shown in FIG. 1 and the dot centers 212 shown in FIGS. 3–6. In particular, in various exemplary embodiments of the systems and methods according to this invention, the desired square zero-shift supercell will appear in the rotated second frame of reference as a square rotated to the first frame of reference, where the corners of the square zero-shift supercell are aligned with the dot centers of the base halftone cells 110.

Figure 3:
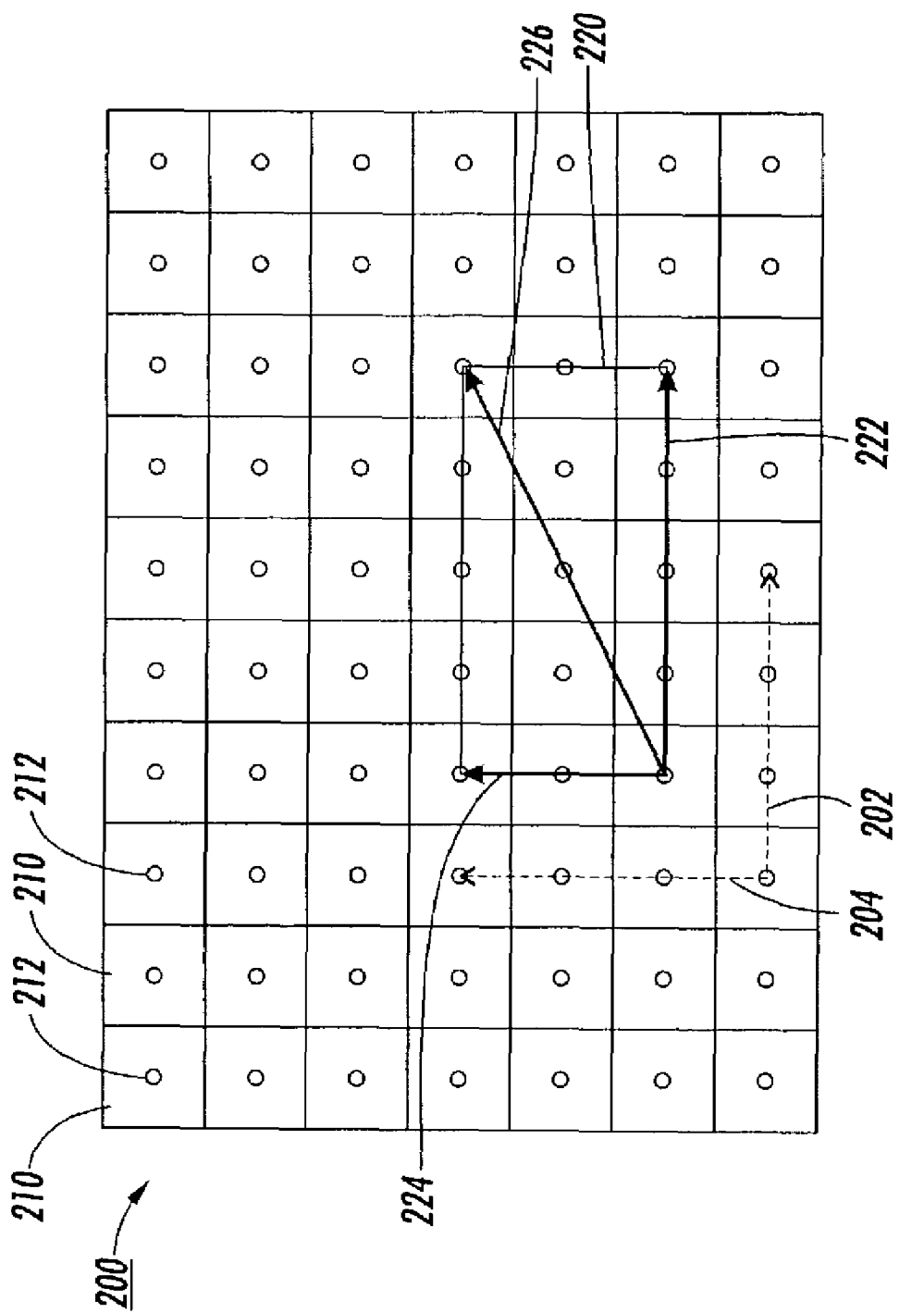
FIG. 3 illustrates uniformly tiled square base halftone cells and a first-non-square supercell in a first frame of reference.

FIG. 3 shows a second halftone screen 200 having a plurality of square uniformly sized base halftone cells 210 having centers 212. The halftone screen 200 defines a first frame of reference having an x-axis 202 and a y-axis 204. A non-square halftone supercell 220 can be formed in the halftone screen 200 having integer values for the orthogonal sides 222 and 224. In general, the first side 222 will have a length N, while the second side 224 will have a length M, where N≠M. The halftone supercell 220 will have a diagonal 226 having a length H that is related to the lengths N and M of the first and second sides 222 and 224 by the Pythagorean theorem, i.e.:

$$H=\sqrt{(N^2+M^2)}. \quad (1)$$

Figure 4:
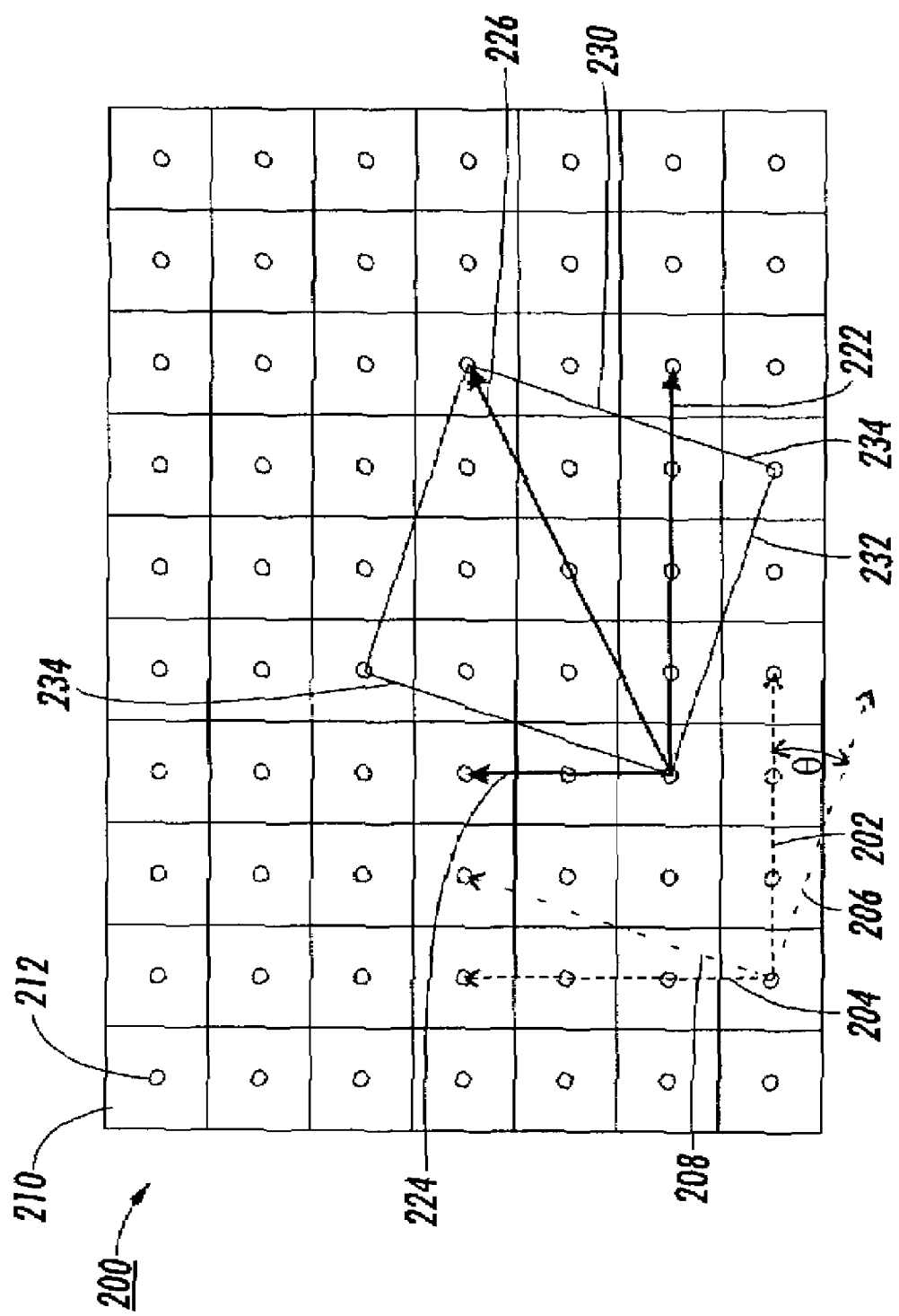
FIG. 4 illustrates an exemplary zero-shift supercell formed in a second frame of reference that is rotated relative to the first frame of reference at an angle related to the diagonal of the non-square supercell.

FIG. 4 shows a square supercell 230 aligned to a second frame of reference defined by the x' axis 206 and the y' axis 208 superimposed at a desired screen angle θ over the halftone screen 200 shown in FIG. 3. In particular, as shown in FIG. 4, the square zero-shift supercell 230 has two orthogonal sides 232 and 234 having lengths P and Q, respectively. However, since the supercell 230 is, by definition, square, the lengths P and Q of the first and second sides 232 and 234 are equivalent. Additionally, and most importantly, the diagonal 226 of the non-square halftone supercell 220 that is aligned with the axes 202 and 204 of the halftone screen 200 is also the diagonal of the square zero-shift supercell 230. Again applying the Pythagorean theorem, the length H of the diagonal 226 in the second frame of reference defined by the axes 206 and 204 is:

$$H=\sqrt{(P^2+Q^2)}. \quad (2)$$

However, since P and Q are equivalent, as outlined above, Eq. (2) becomes:

$$H=\sqrt{(2P^2)}. \quad (3)$$

Substituting Eq. (3) into Eq. (1):

$$\sqrt{(2P^2)}=\sqrt{(N^2+M^2)}. \quad (4)$$

Next, after squaring both sides and solving for P, Eq. (4) becomes:

$$P^2=(N^2+M^2)/2. \quad (5)$$

Importantly, $P^2$ is the area of the square zero-shift supercell 230. At the same time, N and M are defined in units of the base halftone cells 210 shown in FIG. 4. That is, M and N are in units of the center-to-center distance between two centers 212 of the base halftone cells 210 in the frame of reference of the halftone screen 200 defined by the x and y axes 202 and 204. Thus, the center-to-center distance, when squared, is the area associated with a base halftone cell 210. As a result, Eq. (5) defines the implementation area of the square zero-shift halftone cell 230 in units of the number C of dot centers:

$$C=(N^2+M^2)/2. \tag{6}$$

Thus, as outlined above, many combinations of integer components N and M in the first frame of reference can be used to produce an appropriate desired angle θ between the first and second frames of reference. However, only those combinations where the number C of the dot centers 212 effectively contained within the square zero-shift supercell 230, and thus the area of the square zero-shift supercell 230, is an integer number of the areas of the basic halftone cells 210 will result in an implementable supercell.

Figure 5:
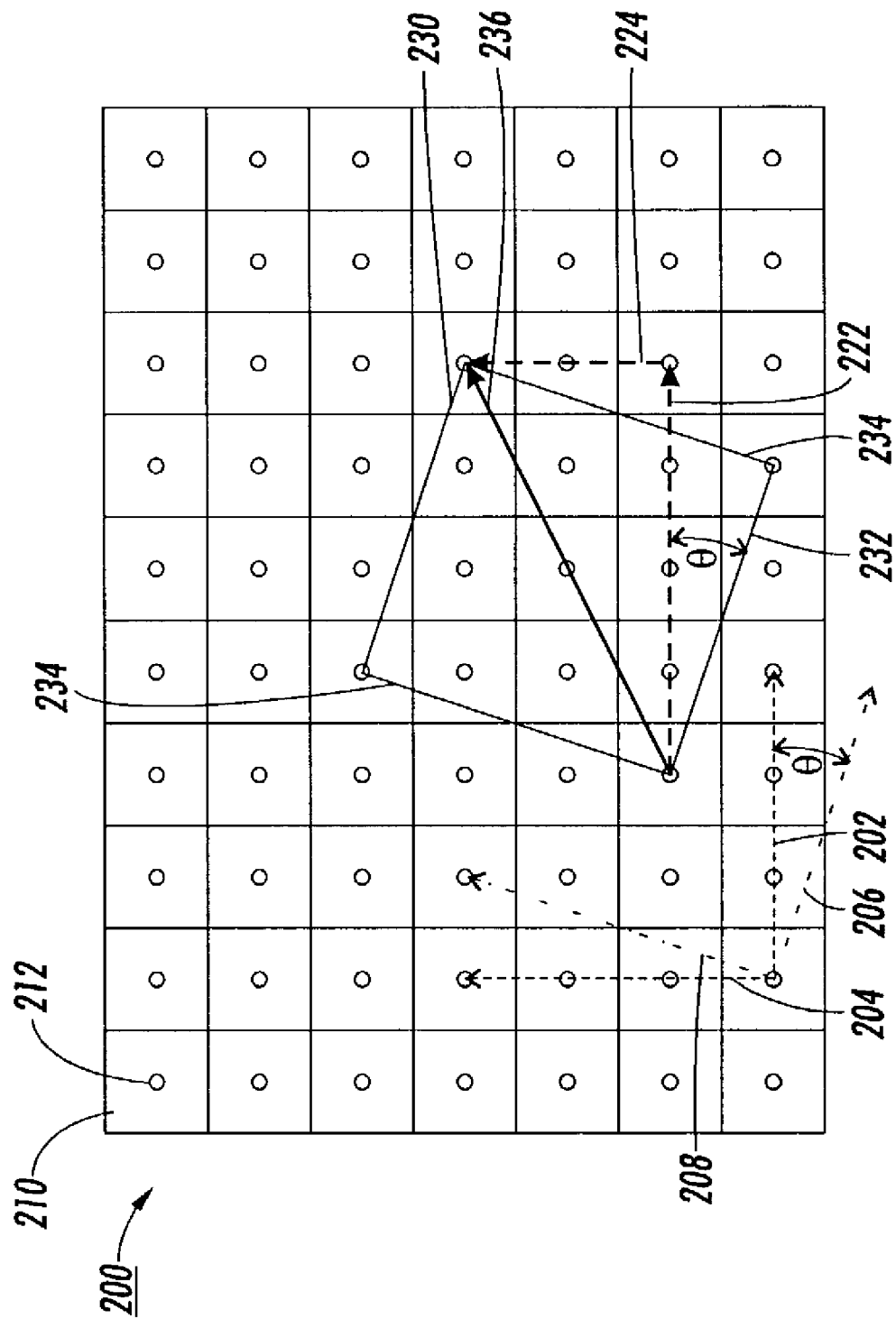
FIG. 5 illustrates the component vectors that represent the square as exemplary square and non-square supercells of FIG. 3 and FIG. 4, and the diagonals of the square and non-square supercells.

FIG. 5 shows the decomposition of the diagonal 236 of the square zero-shift supercell 230 that is in the second frame of reference defined by the x' and y' axes 206 and 208 into x axis and y axis components that are aligned with the x and y axes 202 and 204 of the first frame of reference. That is, as shown in FIG. 5, the diagonal 236 can be decomposed into the orthogonal sides 222 and 224 of a non-square supercell that is aligned with the centers 212 of the basic halftone cells 210 and the x and y axes 202 and 204. In the examples shown in FIGS. 3–5, the diagonal 236 of the square zero-shift supercell 230 can be decomposed into the first and second sides 222 and 224 of the non-square supercell 230 having side lengths N=4 and M=2, respectively. As a result, according to Eq. (6) the effective number of C of the centers 212 contained within the square zero-shift supercell 230 is $(4^2+2^2)/2=10$. Accordingly, because the effective number C of centers in the square zero-shift halftone cell 230 is an integer, the cell 230 shown in FIGS. 4 and 5 is in fact a square zero-shift supercell.

Importantly, since 10 is not a perfect square, it would be difficult to find the square zero-shift supercell 230 having the angle θ between the first and second frames of reference shown in FIG. 3 using conventional Holladay methods. It should also be appreciated that, as yet, it is not necessary to assign units to the square zero-shift supercell 230 because the angles θ and the number C of centers 212 within the square zero-shift supercell 230 can be determined without requiring knowledge of either the resolution or the frequency of the actual halftone screen that will be implemented using this square zero-shift supercell 230.

Figure 6:
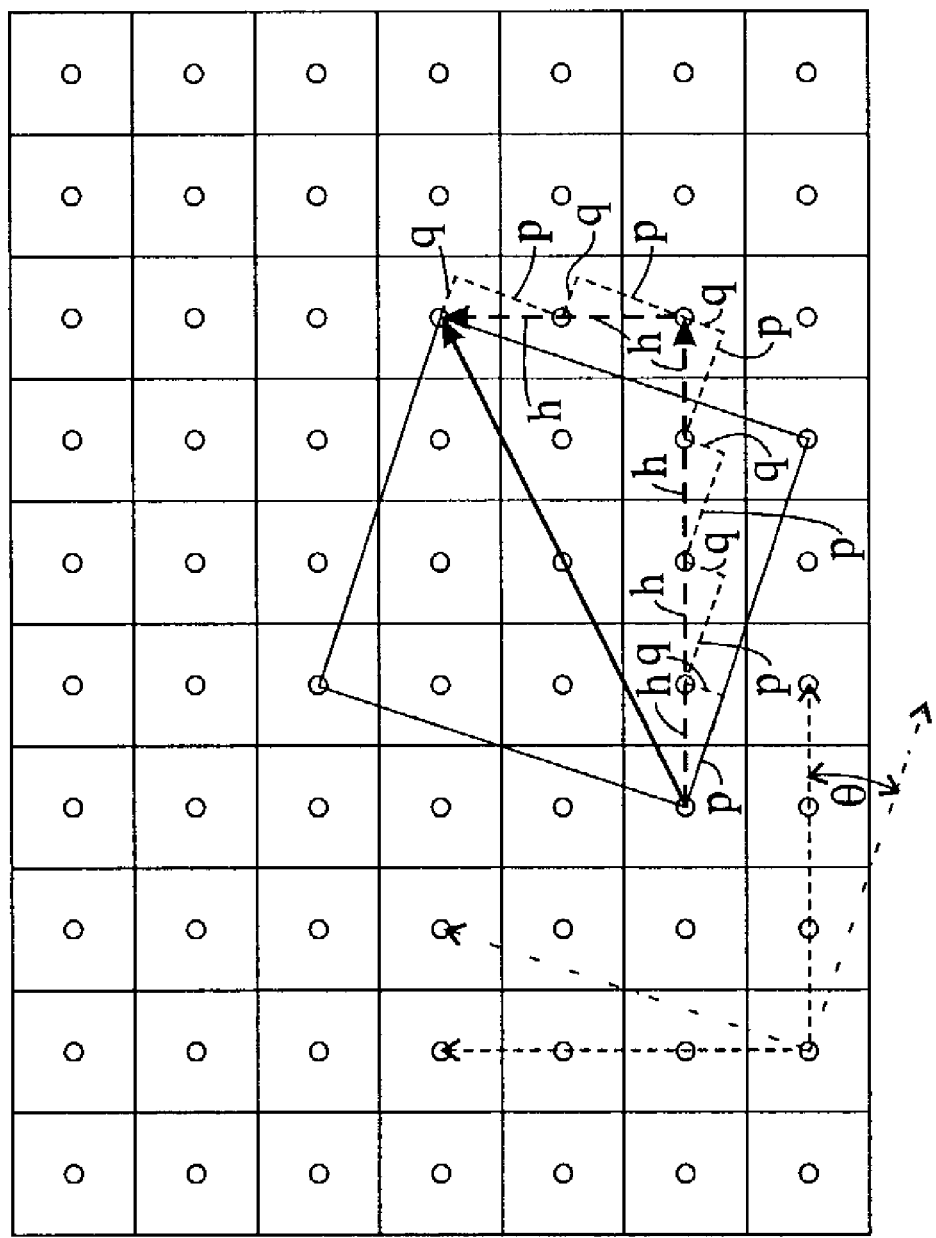
FIG. 6 illustrates how the components of the vectors in the second frame of reference relate trigonometrically to the vectors in the first frame of reference.

It should also be appreciated that, as shown in FIG. 6, the screen angle θ between the first and second frames of reference, which is also the effective visual angle of the halftone screen implemented by the square zero-shift supercell 230, can be related to the lengths N and M of the first and second sides 222 and 224 of the non-square supercell 220. In particular, as shown in FIG. 6, the line h extending between the centers 212 of two laterally adjacent basic halftone cells 210 can act as the hypotenuse of a right triangle having an interior angle equal to θ, with the other two sides of that triangle aligned with the x' and y' axes 206 and 208 of the second frame of reference. In this case, the other two sides of this small right triangle will have side lengths p and q, respectively.

As a result, as shown in FIG. 6, the length P of the first side 232 of the implementable square zero-shift supercell 230 can be determined by adding the number N of the p sides and subtracting M of the q sides, or:

$$P=(N*p)-(M*q). \tag{7}$$

Similarly, the length of the side 234 of the implementable square zero-shift supercell 230 can be determined by adding N of the q sides and M of the p sides, or:

$$Q=(N*q)+(M*p) \tag{8}$$

Since, by definition, as outlined above, the lengths P and Q of the orthogonal sides 232 and 234 of the square zero-shift supercell are equivalent:

$$(N*p)-(M*q)=(N*q)+(M*p). \tag{9}$$

Solving for p and q:

$$q/p=(N-M)/(N+M). \tag{10}$$

However, by definition, since p and q are the lengths of the sides of a right triangle having an interior angle θ:

$$\tan(\theta)=q/p. \tag{11}$$

Thus, solving for θ:

$$\theta=\tan^{-1}((N-M)/(N+M)) \tag{12}$$

Alternatively, solving for M:

$$M=N*(1-\tan(\theta))/(1+\tan(\theta)). \tag{13}$$

In particular, Eq. (12) implies that, should the lengths N and M of the sides 222 and 224 of the non-square supercell 220 be known, the screen angle θ between the non-square supercell 220 and the square zero-shift supercell 230 can be determined. Alternatively, Eq. (13) implies that, for a desired screen angle θ between the base halftone cells 210 aligned with the first frame of reference defined by the x and y axes 202 and 204 and the square zero-supercell 230 aligned with the second frame of reference defined by the x' and y' axes 206 and 208, once an integer value for N is selected, a (probably) non-integer value M' can be determined. Then, an actual integer value for M can be selected as an integer close to the non-integer value M'. The selected value N and the determined value M can then be used to determine the actual screen angle θ and number C of the centers according to Eqs. (11) and (6). Of course, it should be appreciated that, in Eq. (13), instead of solving for M, Eq. (13) could have been developed by solving for N. In this case, for a desired value for the screen angle θ and a selected value for M, a (probably) non-integer value N' could be determined. Then, an integer value for N could be selected as an integer close to the non-integer value N'.

It should also be appreciated that once the angle and the number of centers is determined, using either Eqs. (6) and (12), or Eqs. (6) and (13), the resolution and frequency can then be considered. In particular, the approximate size of the implementable square zero-supercell 230 can be determined by first estimating the effective visual area $A_v$ of a single one of the base halftone cells 210 from the resolution R of the printer on which the square zero-shift halftone screen will be implemented and the desired frequency f of that halftone screen. In particular, the effective visual area $A_v$ is:

$$A_v=(R/f)^2, \tag{14}$$

where:

R is the resolution in pixels per inch of the printer on which the halftone screen is to be implemented; and f is the frequency of that halftone screen in base halftone cells 210 per inch.

Then, the total supercell area $A_s$ will be:

$$A_s=A_v*C. \tag{15}$$

It should be appreciated, as outlined above, C is the number of centers within the square zero-shift halftone cell 230. In particular, the length P of the sides 232 and 234 of the implementable square zero-supercell 230 will be an integer value that is close to the value P', where:

$$P' = \sqrt{(A_s)} \quad (16)$$

If the resolution R is 600 pixels per inch and the frequency f for the halftone screen is desirably close to 150 cells per inch, then the actual effective visual area $A_v$ is equal to $(600/150)^2$, or 16. For the exemplary implementable square zero-shift supercell 230 shown in FIGS. 3–6, C is 10. Thus, the total supercell area $A_s$ is 16*10 or 160. The approximate side length P' is thus $(160)^{.5}$ or 12.6. The nearest integer value to 12.6 is 13. Thus, the side length P of the implementable square shift-supercell 230 is 13. The actual supercell area $A_s$ is thus $13_2$ or 169. Accordingly, the actual effective visual area $A_v$ is $A_s/C$, or 169/10 or 16.9.

From Eq. (14), and rewriting to solve for the actual frequency f, the actual frequency f is $600/(16.9)^{0.5}$ or 145.95 dots/inch.

It should be appreciated that, in general, the effective visual area $A_v$ will not be an integer. In this general case, where the effective visual area $A_v$ is not an integer, in various exemplary embodiments, the realizable supercell often will be designed with non-congruent shapes. That is, in various exemplary embodiments, adjacent dot centers within the supercell will not grow identically in shape from level to level. In that case, the angle and/or the frequency of the dot centers would be exact only on average across the entire supercell.

Alternatively, the effective visual area $A_v$ could be selected to be an integer. In this case, there is a good chance that the implementable square zero-shift supercell 230 can be designed with congruent centers. For example, if the effective visual area $A_v$ is selected as 10, then the implementable square zero-shift supercell 230 can be made up of 10 congruent copies of the simple 3,1 Holladay dot 114 with 10 pixels each and having an angle θ with a value of 18.43 degrees. In particular, it should be appreciated that the simple 3,1 Holladay block in this case would have a width of 10 pixels and a height 7 of one pixel. The supercell can be designed with ten identical sub-cells with identical growth sequences and exact angles and frequencies between dot centers.

By definition in this example, the effective visual area $A_v$ is selected to be 10, and, M and N are 4 and 2, respectively. Thus, C is 10 and the supercell area $A_s$ is (10*10) or 100. The length P of the side of the implementable square zero-shift supercell 230 is $(100)^{.5}$, or 10. Again solving Eq. (14) for the frequency f, the actual frequency f is $600/(10)^{.5}$ or 189.7 dots per inch.

Figure 7:
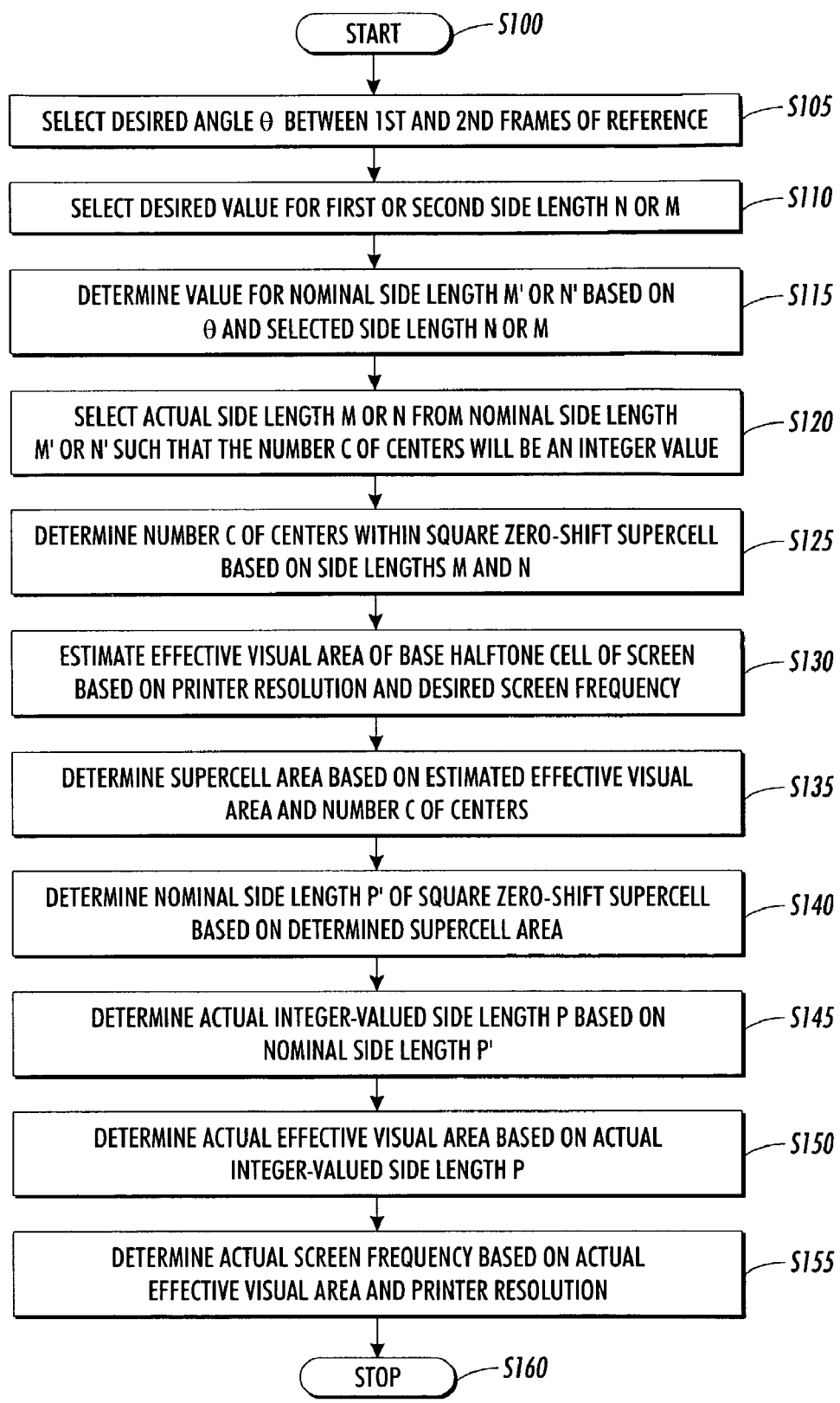
FIG. 7 is a flowchart outlining a first exemplary embodiment of a method for designing a square zero-shift supercell according to this invention.

FIG. 7 is a flowchart outlining a first exemplary embodiment of a method of designing a square-shift supercell according to this invention. As shown in FIG. 7, beginning in step S100, operation continues to step S105, where a desired screen angle θ between the first and second frames of reference is selected. Next, in step S110, a desired value for either the first side length N or the second side length M of the non-square supercell in the first frame of reference is selected. Then, in step S115, the value for the nominal side length M' or N' is determined based on the selected desired screen angle θ and the selected first or second side length N or M. Operation then continues to step S120.

In step S120, the actual side length M or N is selected or determined based on the nominal side length M' or N' such that both lengths, as well as the number C of centers in the square zero-shift supercell, will all be integer values. Next, in step S125, the actual value for the number C of the centers within the square zero-shift supercell is determined based on the side lengths M and N. Then, in step S130, the effective visual area $A_v$ of the base halftone cell of the halftone screen being designed is estimated based on the printer resolution and the desired screen frequency. Operation then continues to step S135.

In step S135, the actual supercell area $A_s$ is determined based on the estimated effective visual area $A_v$ and the number C of the centers that are within the square zero-shift supercell. Then, in step S140, the nominal side length P' of the square zero-shift supercell is determined based on the determined actual supercell area $A_s$. Next, in step S145, the actual integer-value side length P is determined based on the nominal side length P'. Operation then continues to step S150.

In step S150, the actual effective visual area $A_v$ is determined based on the actual integer-value side length P. Next, in step S155, the actual screen frequency f is determined based on the actual effective visual area $A_v$ and the printer resolution R. Then, in step S160, the method stops.

Figure 8:
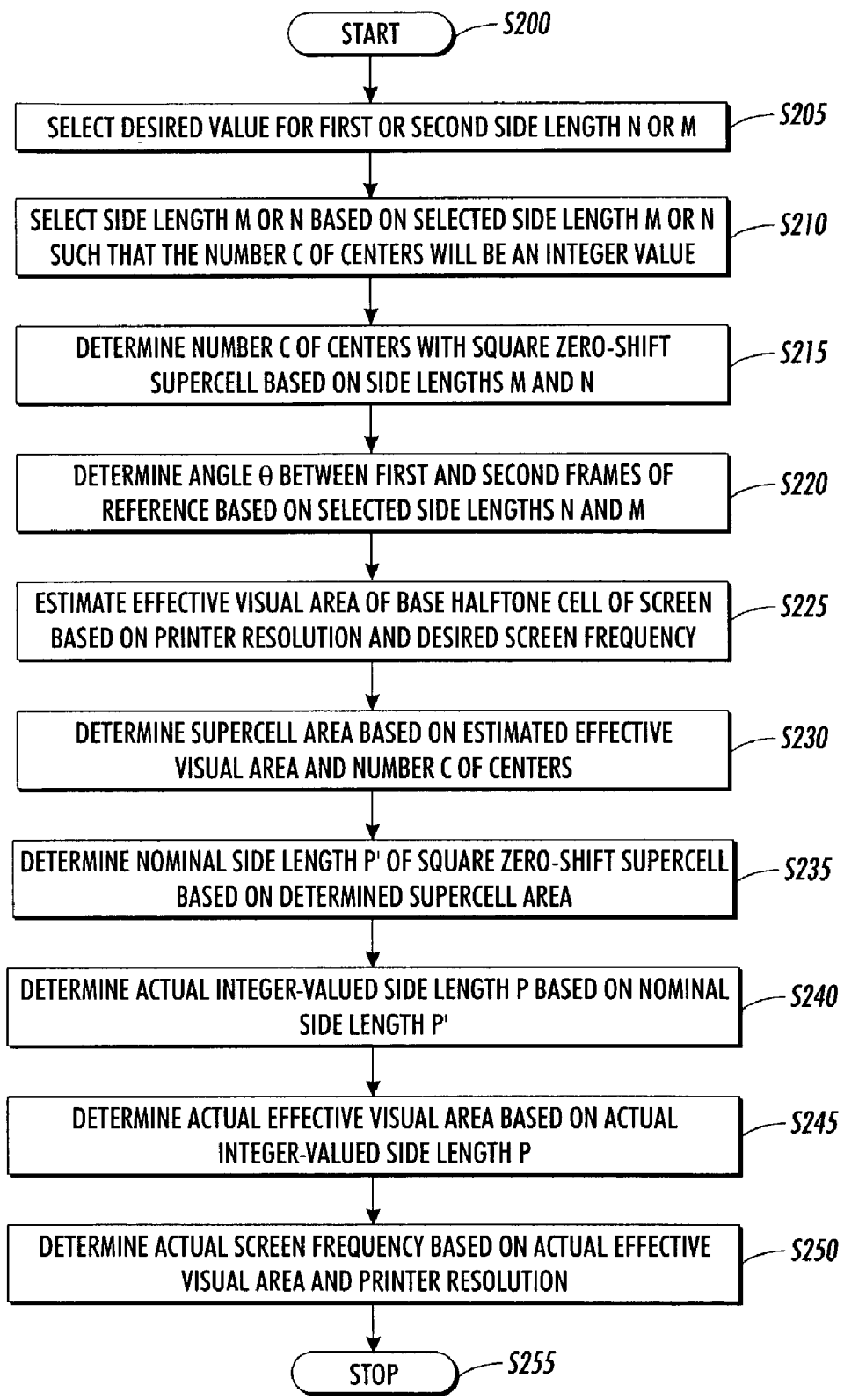
FIG. 8 is a flowchart outlining a second exemplary embodiment of a method for designing a square zero-shift supercell according to this invention.

FIG. 8 is a flowchart outlining a second exemplary embodiment of a method for designing a square zero-shift supercell according to this invention. In general, the steps outlined in FIG. 8 are similar to the steps outlined in FIG. 7. The major difference between the flowcharts outlined in FIGS. 7 and 8 is the order and specific actions performed in steps S205–S220 relative to steps S105–S125.

In particular, beginning in step S200, operation continues to step S205, where a desired value for either the first side length N or the second side length M is selected. Then, in step S210, the side length M or the side length N that was not selected or determined in step S205 is selected such that the number C of centers will be an integer value. Next, in step S215, the numbers C of centers within the square zero-shift supercell is determined based on the first and second side lengths M and N selected in steps S205 and S210. Operation then continues to step S220.

In step S220, the screen angle θ between the first and second frames of reference is determined based on the side lengths M and N selected or determined in steps S205 and S210. Control then continues to step S225. In particular, steps S225–S255 are identical to steps S130–S160, respectively, shown in FIG. 6. Thus, steps S225–255 will not be described in further detail.

Figure 9:
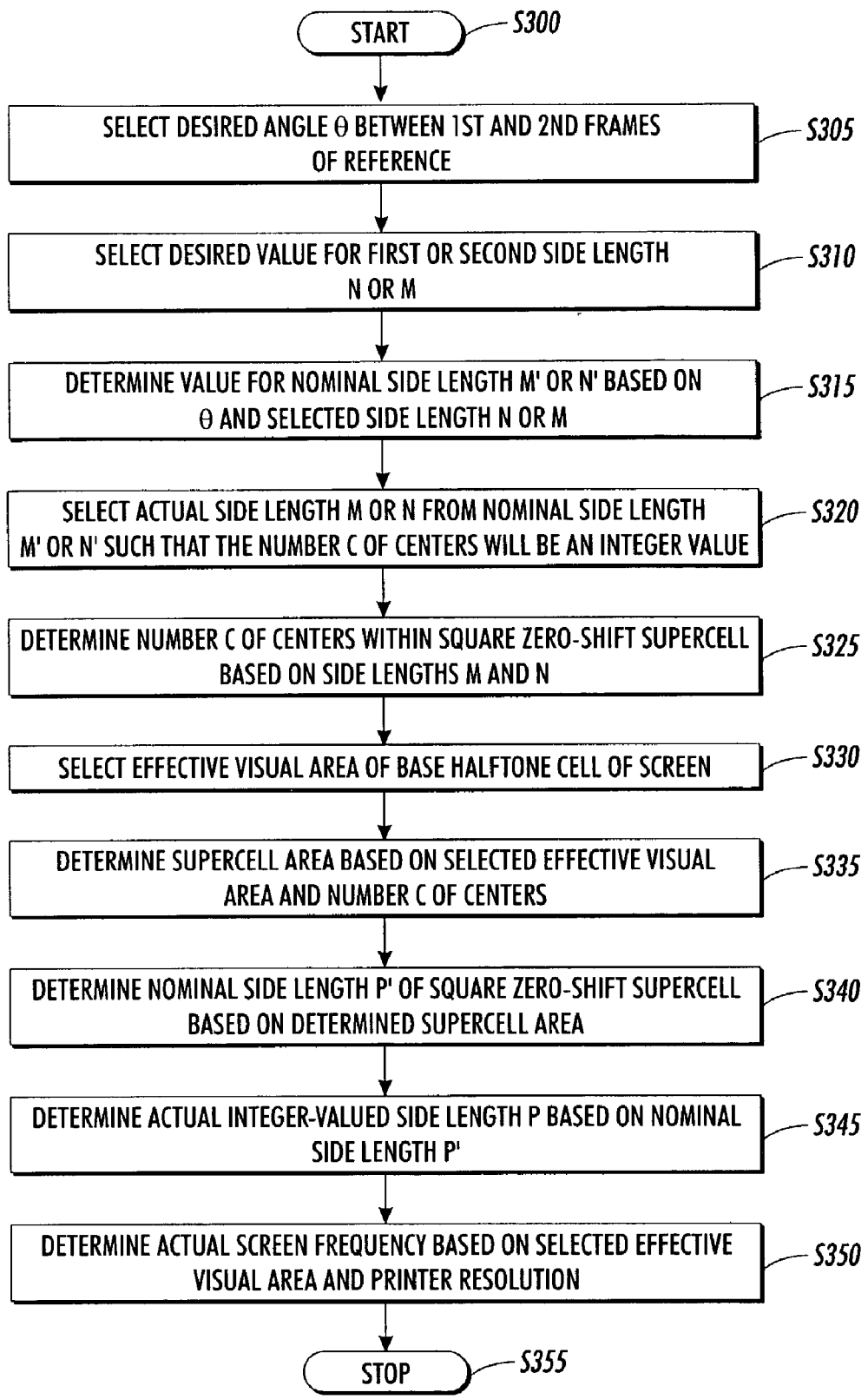
FIG. 9 is a flowchart outlining a third exemplary embodiment of a method for designing a square zero-shift supercell according to this invention.

FIG. 9 is a flowchart outlining a third exemplary embodiment of the method for designing a square zero-shift supercell according to this invention. In particular, steps S305–S325, as shown in FIG. 9, are identical to steps S105–S125 of FIG. 7, as described above. Thus, no further description of these steps will be provided.

In particular, once the number C of centers within the square zero-shift supercell is determined in step S325, operation continues to step S330. In step S330, the actual effective visual area $A_v$ of the base halftone cell of the halftone screen being designed is selected. Next, in steps S335, the actual supercell area $A_s$ is determined based on the selected actual effective visual area $A_v$ and the determined number C of centers. Then, in step S340, the nominal side length P' of the square zero-shift supercell is determined based on the determined actual supercell area $A_s$. Operation then continues to step S345.

In step S345, the actual integer-valued side length P is determined based on the determined nominal side length P'. Then, in step S350, the actual screen frequency f is determined based on the selected effective visual area $A_v$ and the printer resolution R. Then, in step S355, the method ends.

Figure 10:
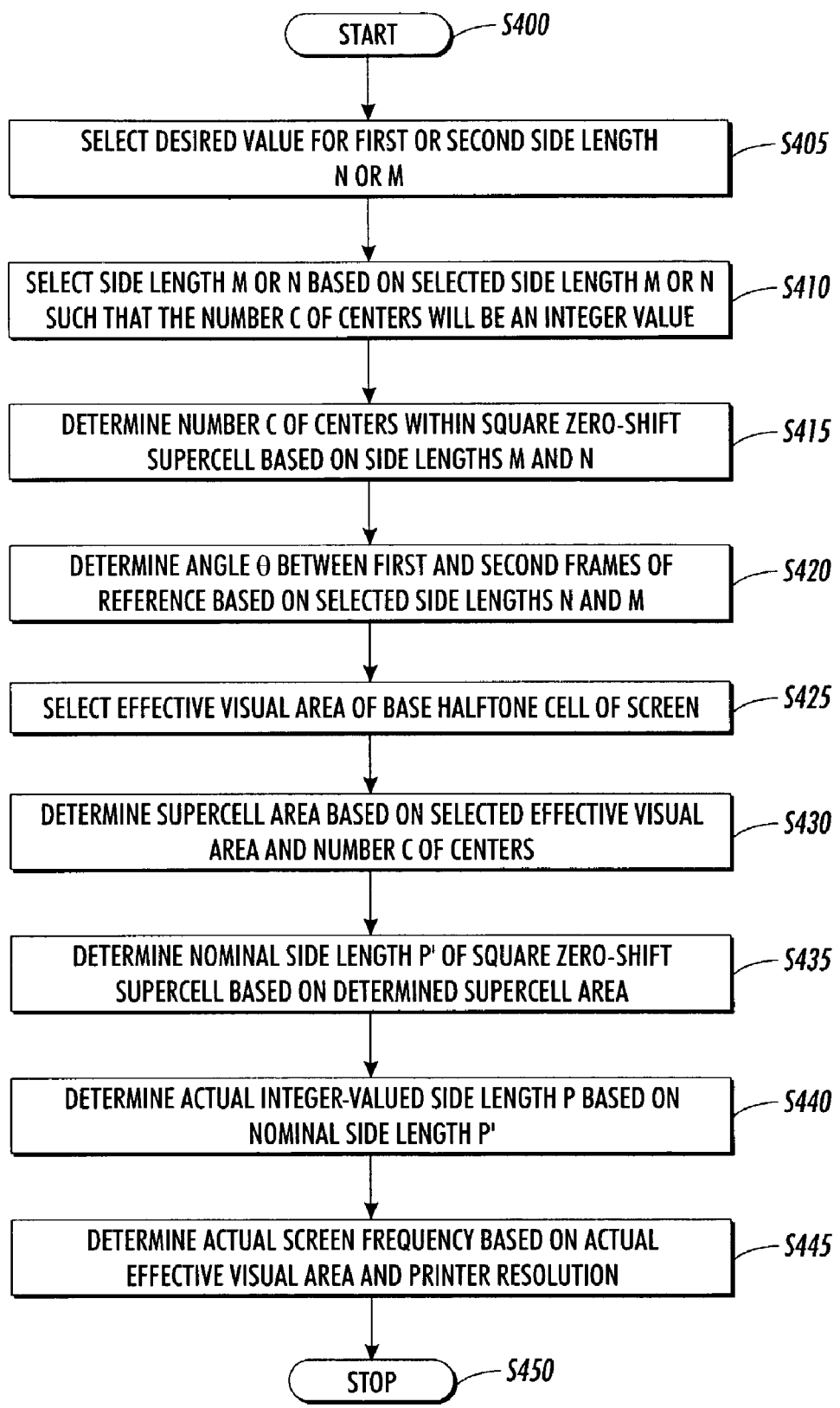
FIG. 10 is a flowchart outlining a fourth exemplary embodiment of a method for designing a square-shift supercell according to this invention.

FIG. 10 is a flowchart outlining a fourth exemplary embodiment of a method for designing a square zero-shift supercell according to this invention. In particular, steps 405–420, as shown in FIG. 10, are identical to steps S205–S220 described above with respect to FIG. 8. Thus, no further description of these steps will be provided. At the same time, steps S425–S450, as shown in FIG. 10, are identical to steps S330–S355 outlined above with respect to FIG. 9. Thus, no further description of these steps will be provided.

FIGS. 11–14 are block diagrams outlining first-fourth exemplary embodiments of square zero-shift supercell designing systems 300–303, respectively, according to this invention. As shown in FIGS. 11–14, the square zero-shift supercell designing systems 300–303 includes one or more of an input/output interface 310, a controller 320, a memory 330, a first nominal side length determining circuit, routine or application 340, a first actual side length selecting or determining circuit, routine or application 350, a center number determining circuit, routine or application 360, an effective visual area estimating circuit, routine or application 370, a supercell area determining circuit, routine or application 380, a second nominal side length determining circuit, routine or application 390, a second actual side length determining circuit, routine or application 400, an actual effective visual area determining circuit, routine or application 410, and an actual screen frequency determining circuit, routine or application 420, each interconnected by one or more control and/or data busses and/or one or more application programming interfaces 430. Additionally, one or more data input devices and/or data output devices 305 are connected to the input/output interface 310.

As shown in FIGS. 11–14, each of the square zero-shift supercell designing systems 300–303 is, in various exemplary embodiments, implemented on a programmed general purpose computer. However, in various exemplary embodiments, each of the square zero-shift supercell designing systems 300–303 is implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 7–10, can be used to implement the square zero-shift supercell designing system 300.

The memory 330 shown in FIGS. 11–14 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the circuits, routines and/or applications shown in FIGS. 11–14 can be implemented as portions of a suitably programmed general-purpose computer. Alternatively, each of the circuits, routines and/or applications shown in FIGS. 11–14 can be implemented as physically distinct hardware circuits within an ASIC, or using a FPGA, a PLD, a PLA or a PAL, or using discrete logic elements or discrete circuit elements. Moreover, the square zero-shift supercell designing system 300 shown in FIGS. 11–14 can be implemented as software executing on a programmed general purpose computer, a special purpose computer, a microprocessor or the like. The particular form each of the circuits, routines and/or applications shown in FIGS. 11–14 will take is a design choice and will be obvious and predicable to those skilled in the art.

Figure 11:
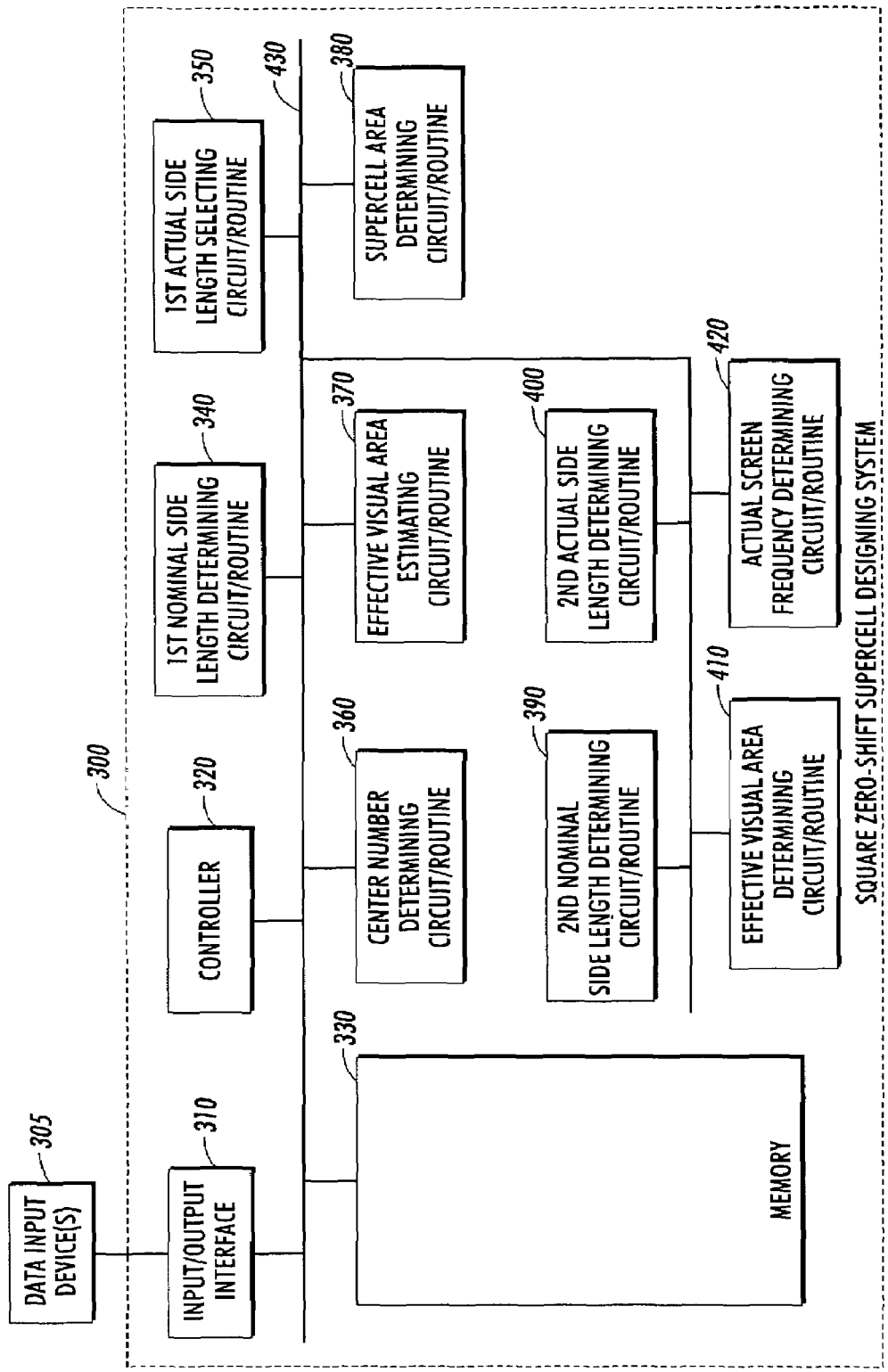
FIG. 11 is a block diagram of a first exemplary embodiment of a system for designing a square zero-shift supercell according to this invention.

In the first exemplary embodiment of the square zero-shift supercell designing system 300 shown in FIG. 11, to create a desired supercell, the user inputs, using the one or more data input and/or output devices 305, data defining a desired screen angle θ between the first and second frames of reference. The user also inputs a desired value for one of the first and second side lengths N or M using the one or more data input and/or output devices 305. Under control of the controller 320, the input/output interface 310 provides this data to the memory 330, which stores this data. Then, the first nominal side length determining circuit, routine or application 340 determines the value for the nominal side length M' or N' of the other side based on the screen angle θ and the side length N or M input through the data input and/or output devices 305 and the input/output interface 310.

Once the nominal side length M' or N' is determined, the nominal side length M' or N' can be output under control of the controller 310 by the input/output interface 310 to the data input and/or output devices 305 to allow the user to select an actual side length M or N based on the determined nominal side length M' or N'. Alternatively, the first actual side length selecting or determining circuit, routine or application 350 can automatically select or determine the actual side length M or N. This selection or determination can use any one of a number of potential techniques. For example, the integer portion of the nominal side length M' or N' determined by the first nominal side length determining circuit or routine could be used as the actual side length. Alternatively, the nominal side length M' or N' could be rounded to the nearest integer using standard mathematical techniques.

Finally, the actual side length could be selected based on a table stored in the memory 330, such as the table set forth below in Table 1. Table 1 could be implemented as a lookup table, where the values for M and N are portions of the address to a memory location.

TABLE 1

| | LENGTH OF FIRST SIDE N | | | | | | | | | |
|---|---|---|---|---|---|---|---|---|---|---|
| | 1 | 2 | 3 | 4 | 5 | 6 | 7 | 8 | 9 | 10 |
| LENGTH OF SECOND SIDE M | | | | | | | | | | |
| 1 | 1 | x | 5 | x | 13 | x | 25 | x | 41 | x |
| 2 | x | 4 | x | 10 | x | 20 | x | 34 | x | 52 |
| 3 | 5 | x | 9 | x | 17 | x | 29 | x | 45 | x |
| 4 | x | 10 | x | 16 | x | 26 | x | 40 | x | 58 |
| 5 | 13 | x | 17 | x | 25 | x | 37 | x | 53 | x |
| 6 | x | 20 | x | 26 | x | 36 | x | 50 | x | 68 |
| 7 | 25 | x | 29 | x | 37 | x | 49 | x | 65 | x |
| 8 | x | 34 | x | 40 | x | 50 | x | 64 | x | 82 |
| 9 | 41 | x | 45 | x | 53 | x | 65 | x | 81 | x |
| 10 | x | 52 | x | 58 | x | 68 | x | 82 | x | 100 |

Table 1 indicates, for a given side value M or N, the potential lengths of the other side N or M that can be selected to provide an integer number of centers. In particular, as shown in Table 1, if the selected side length N or M is even, the actual side length for the other side N or M must also be even. Likewise, if the selected side length M or N is odd, the other side length N or M must be odd as well. This occurs because the sum of the squares of M and N itself must be even to ensure the number C of centers is an integer. The sum of the squares will be even if only both squares are even or both squares are odd. Furthermore, each squared number M or N will be even or odd only if the side lengths M and N are even or odd, respectively.

Once the actual side length for the other side M or N is selected, using either the first actual side length selecting or determining circuit, routine or application 350 or via an input received from the user via the data input and/or output devices 305 and the input/output interface 310, the center number determining circuit, routine or application 360, under control of the controller 320, determines the number C of centers, as outlined above with respect to Eq. (6).

Then, as outlined above with respect to Eq. (14), the estimated effective visual area is determined by the effective visual area estimating circuit, routine or application 370. Next, in accordance with Eq. (15), the total supercell area is determined using the supercell area determining circuit, routine or application 380. The second nominal side length determining circuit, routine or application 390 then determines the nominal side length of the square zero-shift supercell in accordance with Eq. (16).

The actual side length for the square zero-shift supercell is then selected or determined by the second actual side length determining circuit, routine or application 400 as outlined above with respect to the first actual side length selecting circuit, routine or application 350. Alternatively, under control of the controller 320, the nominal side length is output through the input/output interface 310 to the data input and/or output devices 305 to allow the user to select the actual side length for the square zero-shift supercell.

The effective visual area determining circuit, routine or application 410 then determines the actual effective visual area, as outlined above with respect to Eq. (15). The actual screen frequency determining circuit, routine or application 420 then determines the actual screen frequency as outlined above with respect to Eq. (14).

Of course, it should be appreciated that, if the user selects the first or second actual side lengths and/or selects the actual side length of the square zero-shift supercell, the first actual side length selecting circuit, routine or application 350 and the second actual side length determining circuit, routine or application 400, respectively, can be omitted from the first exemplary embodiment of the square zero-shift supercell designing system 300.

Figure 12:
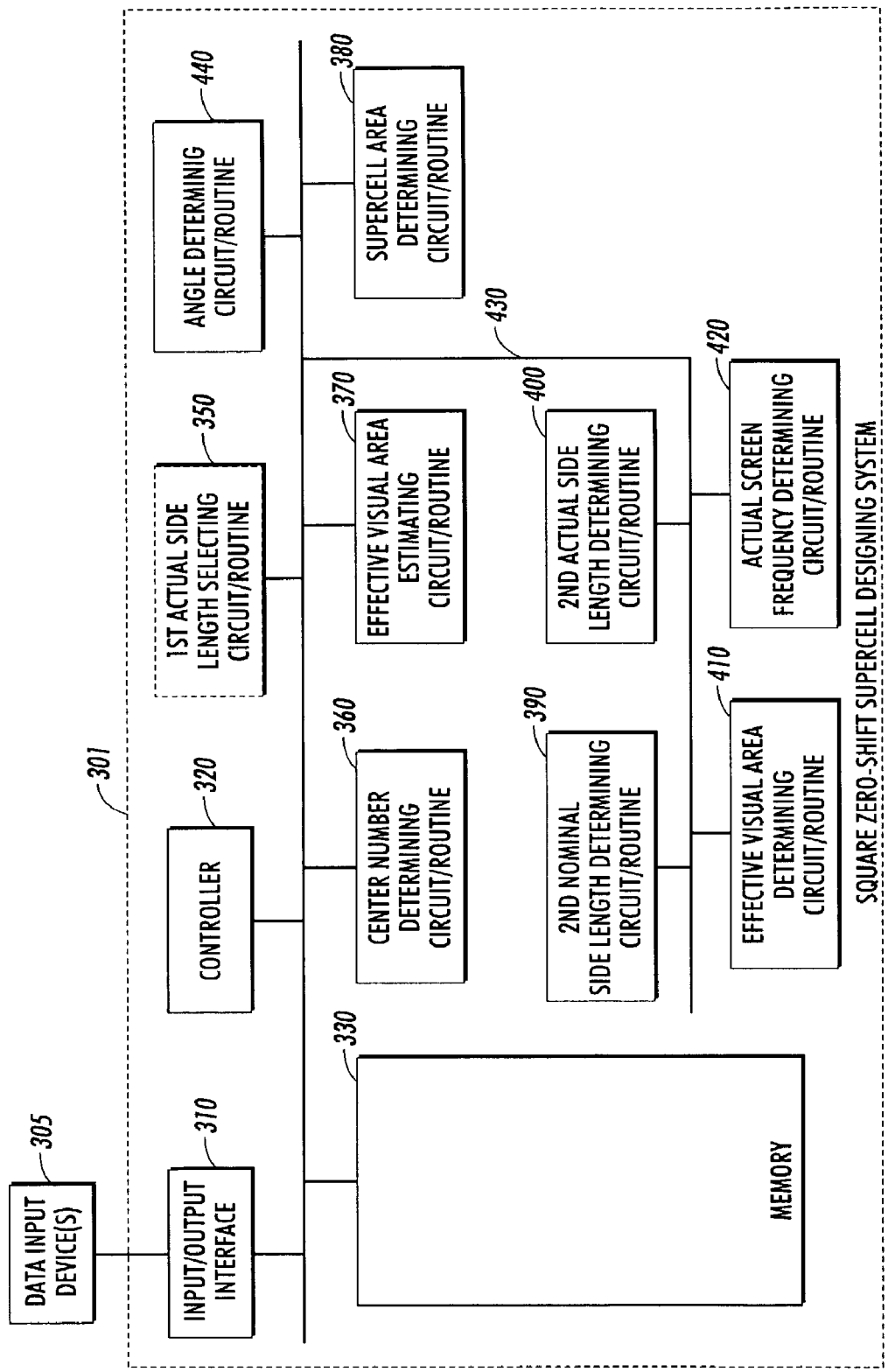
FIG. 12 is a block diagram of a second exemplary embodiment of a system for designing a square zero-shift supercell according to this invention.

FIG. 12 shows the second exemplary embodiment of the square zero-shift supercell designing system 301 according to this invention. As shown in FIG. 12, the second exemplary embodiment of the square zero-shift supercell designing system 301 generally contains the same circuit, routine or application elements as the first exemplary embodiment of the square zero-shift supercell designing system 300. However, in the second square zero-shift supercell designing system 301, the first nominal side length determining circuit, routine or application 340 is omitted entirely, and the first actual side length selection circuit, routine or application 350 can be optionally omitted or included. In addition, the second exemplary embodiment of the square zero-shift supercell designing system 301 includes an angle determining circuit, routine or application 440.

In particular, except as noted below, the operation of the second exemplary embodiment of the square zero-shift supercell designing system 301 is identical to the operation of the first exemplary embodiment of the square zero-shift supercell designing system 300. In particular, after receiving an input through the data input devices 305 defining the desired value for the first or second side length N or M, the second exemplary embodiment of the square zero-shift supercell designing system 301, like the first exemplary embodiment of the square zero-shift supercell designing system 300, either automatically selects or determines the second actual side length using the first actual side length selecting or determining circuit, routine or application 350, or, by omitting the first actual side length selection circuit, routine or application 350, receives a further input via the data input and/or output devices 305 defining the other of the side length N or M. Then, the angle determining circuit, routine or application 440 determines the screen angle according to Eq. (12). Once the two side lengths M and N and the screen angle θ are defined, the operation of the remaining circuits, routines and/or application 360–420 occurs as outlined above with respect to the first exemplary embodiment of the square zero-shift supercell designing system 300.

Figure 13:
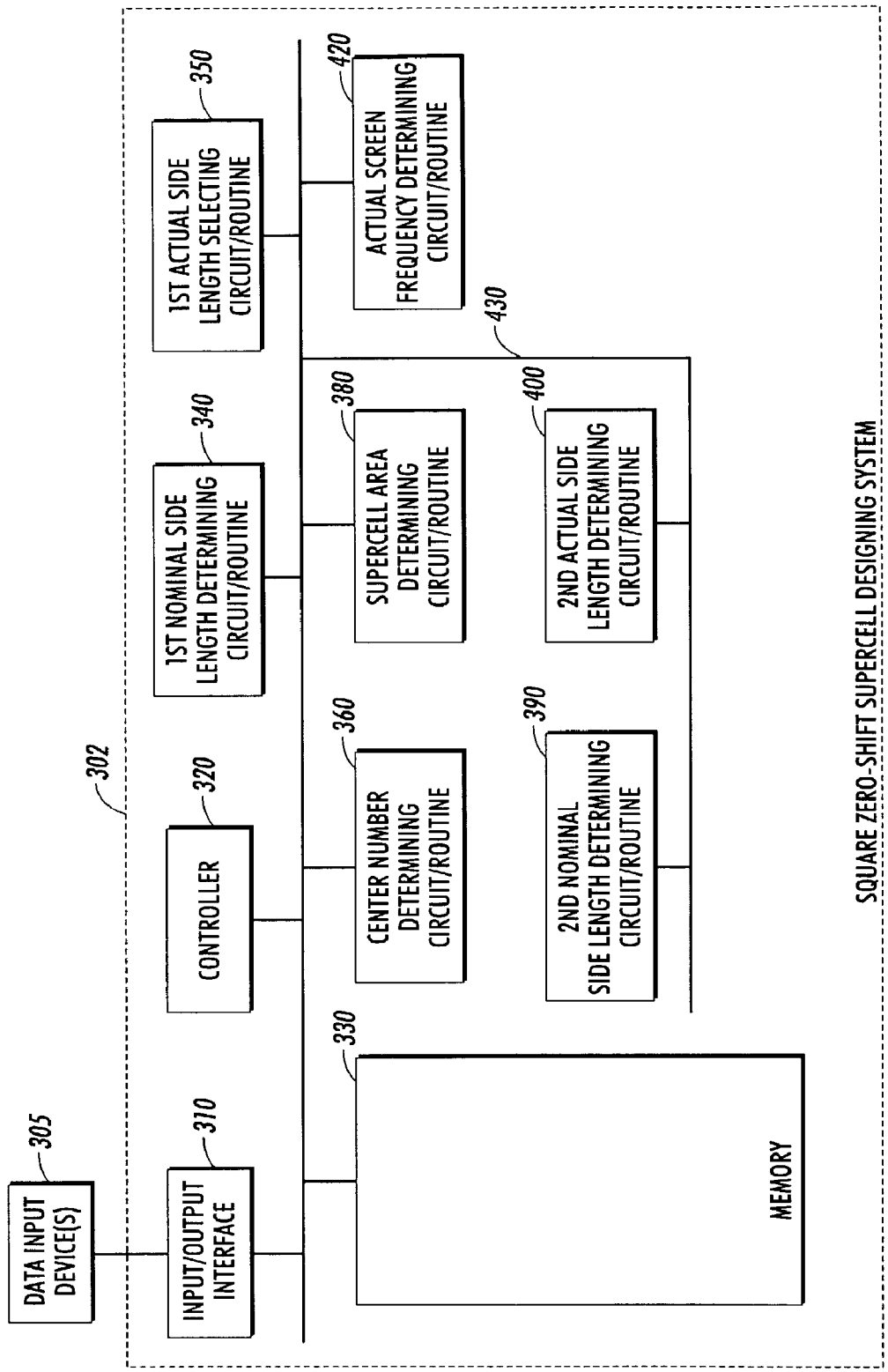
FIG. 13 is a block diagram of a third exemplary embodiment of a system for designing a square zero-shift supercell according to this invention.

FIG. 13 is a block diagram of the third exemplary embodiment of the square zero-shift supercell designing system 302 according to this invention. As shown in FIG. 12, the third square zero-shift supercell designing system 302 is generally identical to the first exemplary embodiment of the square zero-shift supercell designing system 300, except that the effective visual area estimating circuit, routine or application 370 and the effective visual area determining circuit, routine or application 410 are omitted.

In operation, the square zero-shift supercell designing system 302, similarly to the first exemplary embodiment of the square zero-shift supercell designing system 300, inputs the desired screen angle θ and a first one of the first or second side lengths N or M from the user via the data input and/or output devices 305 and the input/output interface 310. However, in addition to these data items, the third exemplary embodiment of the square zero-shift supercell designing system 302 also inputs a selected effective visual area of the base halftone cell from the user through the one or more data input and/or output devices 305 and the input/output interface 310.

Subsequently, the first nominal side length determining circuit, routine or application 340 determines a nominal value for the other side length M' or N' as outlined above. Then, as outlined above with respect to the first exemplary embodiment of the square zero-shift supercell designing system 300, the actual value for the side length of the other side M or N is either input by the user via the one or more data input and/or output devices 305 and the input/output interface 310 or is automatically selected or determined using the actual side length selecting or determining circuit, routine or application 350.

Then, the center number determining circuit, routine or application 360 operates as outlined above. In this case, the user has directly supplied a selected value for the effective visual area $A_v$. As a result, after the center number determining circuit, routine or application 360 determines the number C of centers, the supercell area determining circuit, routine or application 380, the second nominal side length determining circuit, routine or application 390 and the second actual side length determining circuit, routine or application 400 immediately operated as outlined above with respect to the first exemplary embodiment of the square zero-shift supercell designing system 300 based on the effective visual area value supplied by the user.

Likewise, because the user has directly supplied the selected effective visual area, as outlined above, the actual screen frequency determining circuit, routine or application 420 then immediately determines the actual screen frequency, as outlined above with respect to the first exemplary embodiment of the square zero-shift supercell designing system 300.

Figure 14:
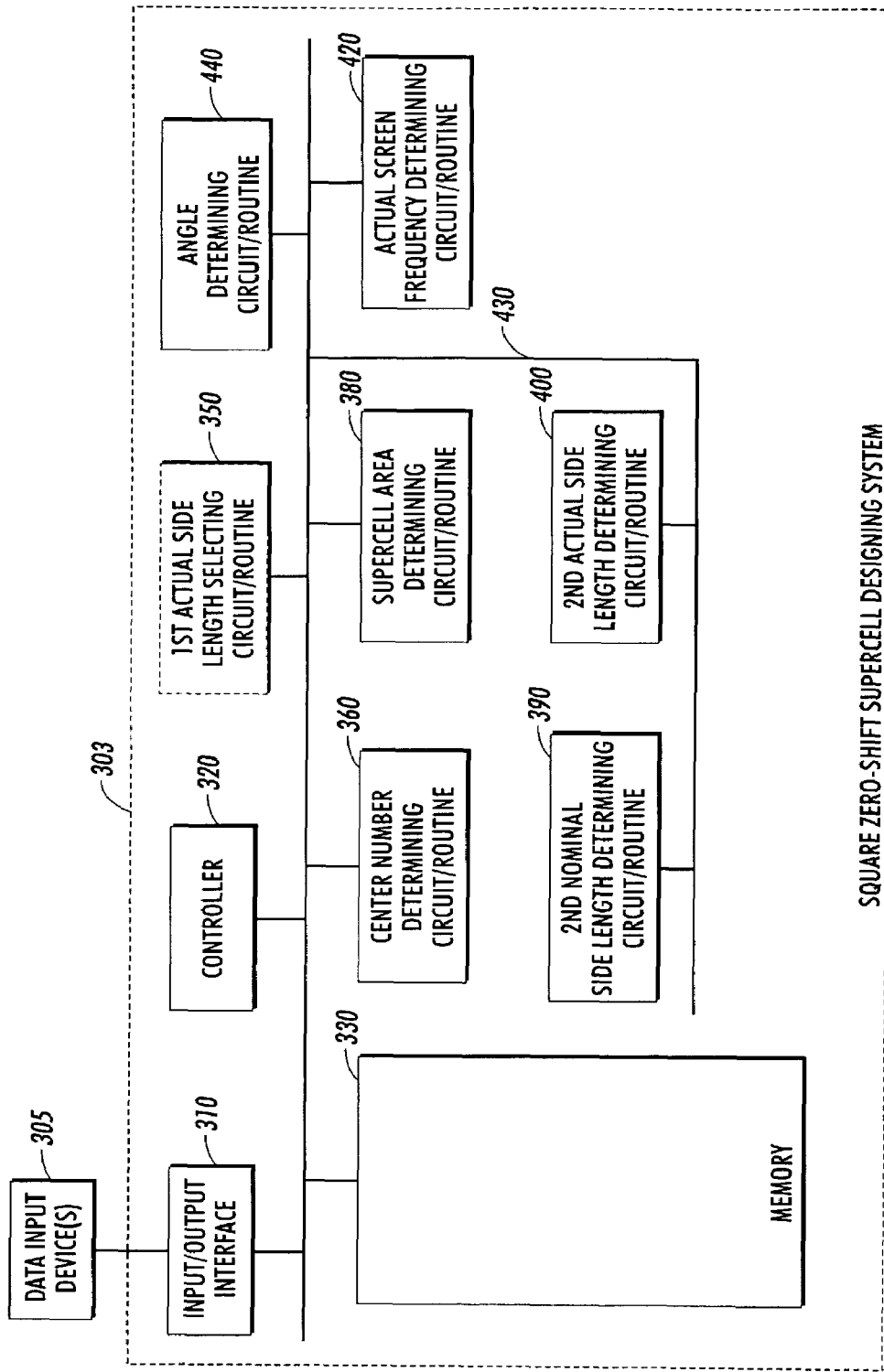
FIG. 14 is a block diagram of a fourth exemplary embodiment of a system for designing a square-shift supercell according to this invention.

FIG. 14 is a block diagram outlining the fourth exemplary embodiment of the square zero-shift supercell designing system 303 according to this invention. In general, the fourth exemplary embodiment of the square zero-shift supercell designing system 303 is identical to the second exemplary embodiment of the square zero-shift supercell designing system 301, except that, like the third exemplary embodiment of the square zero-shift supercell designing system 302, the effective visual area estimating circuit, routine or application 370 and the effective visual area determining circuit, routine or application 410 are omitted. Thus, in operation, the fourth exemplary embodiment of the square zero-shift supercell designing system 303 inputs the selected desired value for the first or second side length M or N and then either automatically selects or determines, or alternately inputs, the value for the other of the side lengths M or N, as outlined above with respect to the second exemplary embodiment of the square zero-shift supercell designing system 301. However, like the third exemplary embodiment of the square zero-shift supercell designing system 302, the fourth exemplary embodiment of the square zero-shift supercell designing system 303 also inputs the selected effective visual area from the user through the one or more data input devices 305 and the input/output interface 310.

Subsequently, the angle determining circuit, routine or application 440 operates as outlined above with respect to the second exemplary embodiment of the square zero-shift supercell designing system 301, while the remaining circuits, routines or application 360, 380–400 and 420 operate as outlined above with respect to the third exemplary embodiment of the square zero-shift supercell designing system 302.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for designing a halftone screen having a square zero-shift halftone supercell, comprising:
   selecting a desired angle between a first frame of reference and a second frame of reference;
   selecting a desired length for a first side of a pair of sides of a non-square supercell in the first frame of reference;
   determining, from the desired angle and the desired length of the first side, a value for a nominal side length for a second side of the pair of sides of the non-square supercell in the first frame of reference, the determined nominal side length being a calculated initial determination of the length of the second side of the pair of sides;
   selecting an actual side length for the second side based on the determined nominal side length of the second side such that a number of centers within the square zero-shift halftone supercell is an integer; and
   determining an integer number of centers within the square zero-shift halftone supercell based on the side lengths of the first and second sides of the non-square supercell.

2. The method of claim 1, further comprising:
   estimating an effective visual area of a basic halftone cell of the halftone screen based on a resolution of a printer by which the halftone screen will be printed and a desired screen frequency; and
   determining a supercell area based on the estimated effective visual area and the determined integer number of centers of the square zero-shift halftone supercell.

3. The method of claim 2, further comprising:
   determining a nominal side length of the square zero-shift halftone supercell based on the determined supercell area; and
   determining an actual integer-valued side length of the square zero-shift halftone supercell based on the determined nominal side length of the square zero-shift halftone supercell.

4. The method of claim 3, further comprising:
   determining an actual effective visual area of the basic halftone cell based on the actual integer-valued side length of the square zero-shift halftone supercell; and
   determining an actual screen frequency based on the actual effective visual area of the basic halftone cell and the printer resolution.

5. The method of claim 1, further comprising:
   selecting an effective visual area of a basic halftone cell of the halftone screen;
   determining a supercell area based on the selected effective visual area and the determined integer number of centers.

6. The method of claim 5, further comprising:
   determining a nominal side length of the square zero-shift halftone supercell based on the determined supercell area; and
   determining an actual integer-valued side length of the square zero-shift halftone supercell based on the determined nominal side length of the square zero-shift halftone supercell.

7. The method of claim 6, further comprising determining an actual screen frequency based on the effective visual area of the basic halftone cell and a resolution of a printer by which the halftone screen will be printed.

* * * * *